No. 788,608. Patented May 2, 1905.

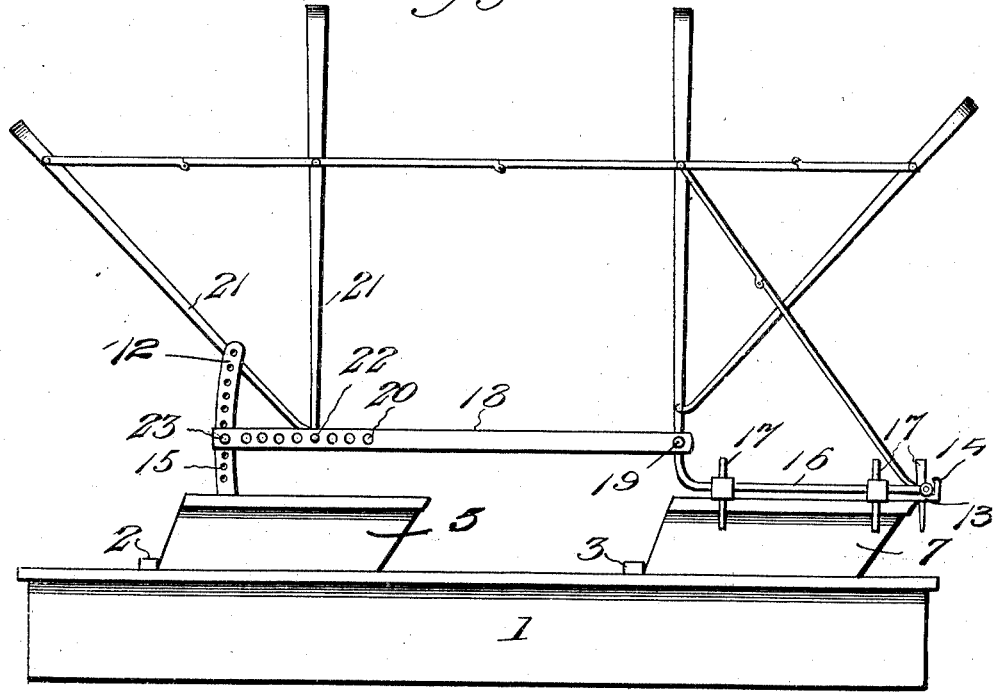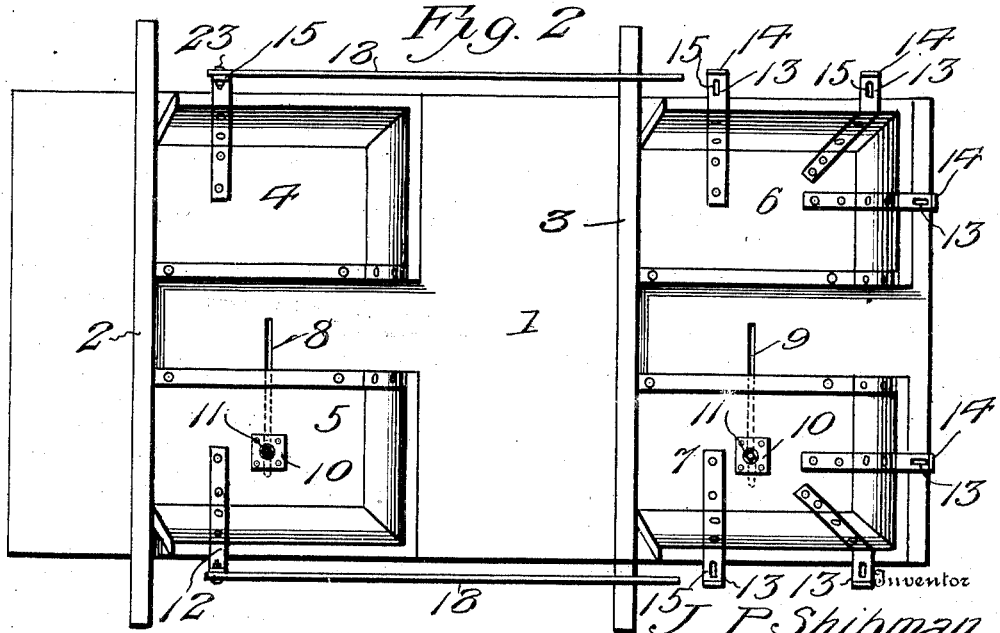

UNITED STATES PATENT OFFICE.

JOHN P. SHIPMAN, OF ST. LOUIS, MISSOURI.

CARRIAGE-TOP FORMER.

SPECIFICATION forming part of Letters Patent No. 788,608, dated May 2, 1905.

Application filed July 5, 1904. Serial No. 215,367.

*To all whom it may concern:*

Be it known that I, JOHN P. SHIPMAN, a citizen of the United States, residing at St. Louis, State of Missouri, have invented new and useful Improvements in Carriage-Top Formers, of which the following is a specification.

This invention relates to carriage-top formers.

The objects of the invention are to improve and simplify the construction of such devices.

With these and other objects in view, which will appear as the description proceeds, the invention resides in the novel combination and arrangement of parts and in the details of construction hereinafter described and claimed as a practical embodiment of the invention.

In the accompanying drawings, forming part of this specification, Figure 1 is a side elevation of a device constructed in accordance with the invention. Fig. 2 is a plan view thereof with the forming-frame removed. Fig. 3 is a detail view of one of the wedge-shaped pins used for holding the forming-frame in position.

Similar numerals of reference indicate corresponding parts throughout the several views.

The numeral 1 designates the base of the improved device, which may be of any suitable form and construction. Arranged transversely upon the upper surface of the base 1 are guides or abutments 2 and 3 for the front and back adjustable seat-forms 4 5 and 6 7, respectively. Formed in the upper surface of the base 1 adjacent to the front seat-forms is a slot 8, a similar slot 9 being formed in said base adjacent to the rear seat-forms. A plate, such as 10, is attached to the bottom of each of the seat-forms 5 and 7, a headed adjusting-bolt 11 passing through said plate and through the adjacent slot. By loosening the adjusting-bolts 11 the seat-forms 5 and 7 may be adjusted transversely to any desired position upon the base 1 and clamped immovably in adjusted position by retightening the bolts 11, as will be understood. A plurality of brackets 13 is fastened in any suitable manner, as by screws or bolts, to each of the seat-forms 6 and 7. At its outer end each of the brackets 13 is curled or bent back upon itself, as shown at 14, a slot 15 being formed in each bracket adjacent to the curled or bent end thereof. Upon each of the seat-forms 4 and 5 is fastened an upright 12, each of which uprights 12 is formed with a series of adjusting-holes 15'. After the seat-forms 4 5 and 6 7 have been adjusted to the proper width and clamped immovably in their adjusted position the side rails 16 of the forming-frame are placed upon the brackets 13 and are held firmly thereon by means of wedge-shaped pins, such as 17, Fig. 3, which are driven into the slots 15 and serve to force said side rails firmly beneath the curled or bent outer ends of the brackets. According to the present invention the forming-frame is provided with side bars 18, which are pivotally connected to the gooseneck, as shown at 19, the forward end of each side bar being formed with a plurality of adjusting-holes 20, by which means the forward frame-hoops 21 are pivotally connected to the side bars 18, as shown at 22, and may be adjusted forward or backward upon the said side bars. At its forward end each of the said bars is connected, by means of a pin 23, to one of the uprights 12. The remaining parts of the forming-frame are hinged to each other, as is usual in carriage constructions, in order to secure the proper adjustment. When it is desired that the forward portion of the frame shall be higher than the rearward portion thereof, the forward ends of the side bars may be raised upon the uprights 12 by removing the pins 23 and placing them in higher adjusting-holes. In like manner the forward end of the frame may be lowered.

The device of this invention is simple and inexpensive in construction. Furthermore, it is adapted to be adjusted easily to suit any required form of carriage-top.

In its combination and arrangement of parts and in its details of construction it presents an improvement over prior devices of a similar character.

Having thus described the invention, what is claimed is—

1. A carriage-top former, comprising transversely-adjustable seat-forms, brackets on the rear seat-forms having slots and curled ends, side rails resting upon said brackets, and wedge-shaped pins fitted in the slots of the brackets and holding the side rails against the curled ends thereof.

2. A carriage-top former, comprising a base, transversely-adjustable seat-forms thereon, brackets on the rear seat-forms having slots and curled ends, uprights upon the front seat-forms having adjusting-holes, side rails resting upon the curled brackets of the rear seat-forms, wedge-shaped pins fitting into the slots of said brackets and holding said side rails in position, side arms pivoted to the side rails and having adjusting-holes therein, a pin passing through each of the side arms and through one of the uprights on the front seat-forms, and forming hoops adjustably connected to the side bars by means of the adjusting-holes therein.

3. A carriage-top former, comprising adjustable seat-forms, side rails connected with the rear seat-forms, and means for removably retaining said side rails in position.

4. A carriage-top former, comprising adjustable seat-forms, side rails connected with the rear seat-forms, means for removably retaining said side rails in position, side arms pivotally connected with the side rails, and means adjustably connecting the side arms with the front seat-forms.

In testimony whereof I affix my signature in presence of two witnesses.

JOHN P. SHIPMAN.

Witnesses:
ROBERT N. DENHAM,
EDWARD M. PRIMEAU.